United States Patent

Nakajima et al.

[11] Patent Number: 5,083,654
[45] Date of Patent: Jan. 28, 1992

[54] PARTS FEEDER

[75] Inventors: Saburo Nakajima; Keisuke Wakatsuki, both of Kanagawa, Japan

[73] Assignee: Fuji Photo Film Co., Ltd., Kanagawa, Japan

[21] Appl. No.: 386,851

[22] Filed: Jun. 7, 1989

[30] Foreign Application Priority Data

Jun. 8, 1988 [JP] Japan .................. 63-140813

[51] Int. Cl.$^5$ .................................. B65G 43/00
[52] U.S. Cl. .................................. 198/444; 198/380; 198/493
[58] Field of Search ............... 198/380, 391, 444, 493, 198/524; 221/160

[56] References Cited

U.S. PATENT DOCUMENTS

| | | | |
|---|---|---|---|
| 2,832,462 | 4/1958 | Simer | 198/524 |
| 3,295,661 | 1/1967 | Mitchell et al. | 198/444 |
| 3,300,022 | 1/1967 | Sterling | 198/380 |
| 3,907,099 | 9/1975 | Smith | 198/444 |

Primary Examiner—Joseph E. Valenza
Attorney, Agent, or Firm—Sughrue, Mion, Zinn Macpeak & Seas

[57] ABSTRACT

A parts feeder for feeding a plurality of parts along an annular conveyance path and a linear conveyance path connected to the annular conveyance path comprises an adjustment device which is provided midway along the annular conveyance path and which adjusts the parts, and a fill detector which is provided midway along the linear conveyance path and which detects filling of the linear conveyance path with the parts and generates a fill signal in order to stop parts feed to the linear conveyance path when the linear conveyance path is filled with the parts. A compressed air feeder is located in the vicinity of the adjustment device. The compressed air feeder blows compressed air against at least the parts located at the adjustment device in order to remove the parts from the adjustment device while the parts feed to the linear conveyance path is being stopped.

3 Claims, 1 Drawing Sheet

PARTS FEEDER

BACKGROUND OF THE INVENTION

1. Field of the Invention

This invention relates to a parts feeder which sequentially feeds light, small-sized parts such as springs. This invention particularly relates to a parts feeder wherein a conveyance path, along which the parts are conveyed, is prevented from being clogged with the parts.

2. Description of the Prior Art

Parts feeders have heretofore been known as a means for feeding small-sized parts such as torsion springs to various types of assembly apparatuses. The parts feeder conveys the parts along an annular conveyance path, for example, a spiral conveyance path, and a linear conveyance path which is connected to the annular conveyance path. The annular conveyance path is provided with an adjustment means which adjusts, for example, the orientations of the parts sequentially fed from a feed tank and lines up the parts. The parts are thereafter conveyed along the linear conveyance path to the corresponding assembly apparatus. Also, the linear conveyance path is provided with a fill detection means which generates a fill detection signal when the linear conveyance path is filled with the parts. When the fill detection signal is generated, the parts feeder temporarily stops conveying the parts along the annular conveyance path to the linear conveyance path. After the fill condition on the linear conveyance path is eliminated, the parts feeder restarts conveying the parts along the annular conveyance path to the linear conveyance path. However, when the parts which are being conveyed are stopped forcibly or when the parts which are kept stationary are moved forcibly, the parts are vibrated and entangled, and the entangled parts clog the annular conveyance path. Therefore, the parts cannot be fed smoothly to the assembly apparatus.

Accordingly, in order to eliminate the problem described above, compressed air has heretofore been blown against the overall area of the annular conveyance path. Alternatively, several clogging detection means have heretofore been located at positions where clogging arises readily, and compressed air has heretofore been blown against the position where clogging is detected, thereby to remove the clogging parts from the conveyance path.

However, with the technique wherein compressed air is blown against the overall area of the annular conveyance path, parts which have been lined up are often removed from the annular conveyance path together with the parts which are entangled. Therefore, the parts cannot be fed at a constant rate to the assembly apparatus. Also, if the pressure of compressed air were increased markedly, all parts would be removed from the annular conveyance path. Therefore, the pressure of compressed air must be kept at a low level which is insufficient to remove clogging parts.

With the technique wherein a plurality of clogging detection means are used, good effects of removing the clogging parts are obtained. However, since a plurality of clogging detection means and a plurality of compressed air feed means must be provided, the manufacturing cost of the parts feeder increases.

SUMMARY OF THE INVENTION

The primary object of the present invention is to provide a parts feeder which efficiently prevents a parts conveyance path from being clogged with parts.

Another object of the present invention is to provide a parts feeder which is cheap.

The inventors analyzed entanglement of parts on conveyance paths of parts feeders and clogging of the conveyance paths with the parts, and found that the entanglement and the clogging arise most readily at an adjustment means provided at an annular conveyance path, and can be eliminated when the parts are removed from the adjustment means.

Accordingly, the present invention provides a parts feeder for feeding a plurality of parts along an annular conveyance path and a linear conveyance path connected to the annular conveyance path, the parts feeder comprising an adjustment means which is provided midway along the annular conveyance path and which adjusts the parts, and a fill detection means which is provided midway along the linear conveyance path and which detects filling of the linear conveyance path with the parts and generates a fill signal in order to stop parts feed to the linear conveyance path when the linear conveyance path is filled with the parts, wherein the improvement comprises the provision of a compressed air feed means which is located in the vicinity of said adjustment means and which blows compressed air against at least the parts located at said adjustment means in order to remove said parts from said adjustment means while the parts feed to the linear conveyance path is being stopped.

The annular conveyance path may be composed of a spiral conveyance path which is constituted of a plurality of rings connected one after another. Alternatively, the annular conveyance path may be composed of a single ring.

With the parts feeder in accordance with the present invention, the parts located at the adjustment means are removed by compressed air while the feed (i.e., conveyance) of the parts is being stopped. Therefore, all parts which are entangled with one another when the parts are stopped forcibly and all parts which may be entangled with one another when the parts are moved again are removed from the annular conveyance path. Accordingly, the conveyance path is not clogged with parts when the feed of the parts is stopped and restarted repeatedly. As a result, parts can be fed smoothly to an assembly apparatus. Also, because no particular means is required to detect entanglement of parts, the manufacturing cost of the parts feeder in accordance with the present invention can be kept low.

DESCRIPTION OF THE PREFERRED EMBODIMENTS

The present invention will hereinbelow be described in further detail with reference to the accompanying drawings.

Figure 1:
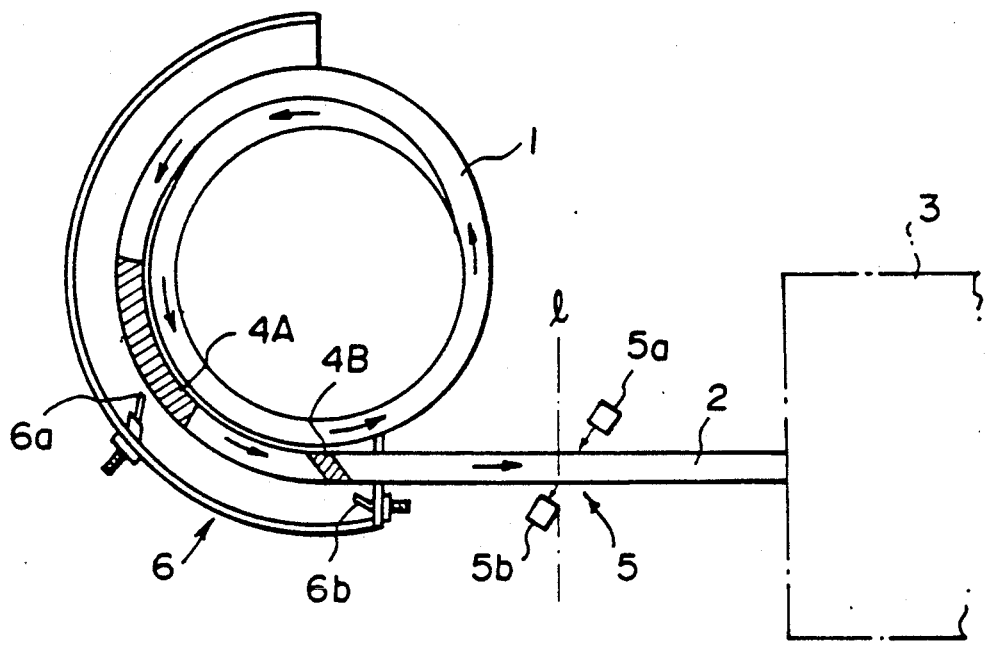
FIG. 1 is a schematic plan view showing an embodiment of the parts feeder in accordance with the present invention.

With reference to FIG. 1, a parts feeder comprises a spiral conveyance path 1 which extends gradually upwardly, and a linear conveyance path 2 which continues to the spiral conveyance path 1. Parts such as torsion springs are fed from a feed tank (not shown), which is connected to a lower edge of the spiral conveyance path 1, and conveyed along the spiral conveyance path 1 and linear conveyance path 2 to an assembly apparatus 3 which is connected to a forward edge of the linear conveyance path 2. Adjustment means 4A and 4B are provided at positions (hatched in FIG. 1) on the spiral conveyance path 1. The adjustment means 4A and 4B adjust, for example, orientations and positions of the parts before the parts are conveyed to the linear conveyance path 2. Therefore, the parts are correctly lined up and then conveyed along the linear conveyance path 2.

The rate at which the parts are fed along the spiral conveyance path 1 and the linear conveyance path 2 is set to a value slightly higher than the rate at which the parts are used in the assembly apparatus 3 so that the parts are continuously fed to the assembly apparatus 3. Some time after feed of the parts along the spiral conveyance path 1 and the linear conveyance path 2 was begun, the linear conveyance path 2 is gradually filled with the parts. The fill with the parts begins at the forward edge of the linear conveyance path 2 and progresses reversely to the direction along which the parts are fed. Therefore, a fill detection means 5 is provided by the side of the linear conveyance path 2. The fill detection means 5 detects the fill condition of the linear conveyance path 2 with the parts, and generates a fill detection signal in order temporarily to stop feeding the parts along the spiral conveyance path 1 to the linear conveyance path 2. By way of example, the fill detection means 5 is composed of a light emission means 5a which emits light to the linear conveyance path 2, and a light sensor 5b which detects the light. When the fill with the parts occurs beyond a position 1, the light sensor 5b detects a change in the amount of light received, and generates the fill detection signal. When the fill detection signal is generated, feed of the parts along the spiral conveyance path 1 to the linear conveyance path 2 is stopped. The feed of the parts along the spiral conveyance path 1 to the linear conveyance path 2 is restarted after the fill of the linear conveyance path 2 with the parts is eliminated.

Figure 2:
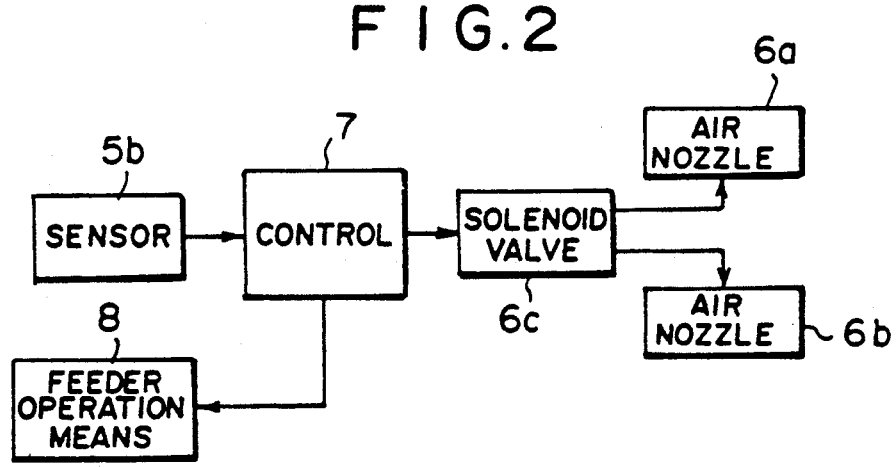
FIG. 2 is a block diagram showing the relationship among operations of a fill detection means, a feeder operating means and a compressed air feed means.
Figure 3:
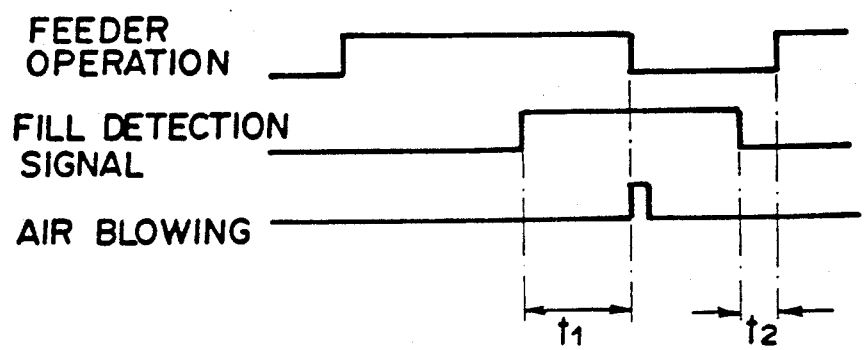
FIG. 3 is a timing chart showing the relationship among the operations of a fill detection means, a feeder operating means and a compressed air feed means.

When the feed of the parts along the spiral conveyance path 1 is stopped and restarted (i.e., when movement of the parts on the spiral conveyance path 1 is stopped and restarted), the parts are readily entangled with one another due to movement shocks at the adjustment means 4A and 4B, and the spiral conveyance path 1 is clogged with the parts which are entangled with one another. Therefore, a compressed air feed means 6 is provided in the vicinity of the adjustment means 4A and 4B in order to blow compressed air against the parts at the adjustment means 4A and 4B, to thereby eliminate clogging with the parts. The compressed air feed means 6 has air nozzles 6a and 6b which respectively face the adjustment means 4A and 4B and which blow compressed air against the adjustment means 4A and 4B in the direction approximately reverse to the direction along which the parts are conveyed. While the parts are kept stationary on the spiral conveyance path 1, compressed air is blown from the air nozzles 6a and 6b in order to remove all parts, which are present at the adjustment means 4A and 4B, from the spiral conveyance path 1. Operations of the compressed air feed means 6 for removing the parts will hereinbelow be described with reference to FIGS. 2 and 3.

When the light sensor 5b detects the fill condition of the linear conveyance path 2 with the parts and generates the fill detection signal, the fill detection signal is fed to a controller 7. When the controller 7 receives the fill detection signal for a predetermined consecutive time t1, the controller 7 feeds a signal to a feeder operation means 8 in order to stop feeding of parts along the spiral conveyance path 1. Also, the controller 7 feeds a control signal to a solenoid valve 6c, which is connected to the air nozzles 6a and 6b, in order to open the solenoid valve 6c and to blow compressed air from the air nozzles 6a and 6b. Therefore, when movement of the parts on the spiral conveyance path 1 is stopped, all parts present at the adjustment means 4A and 4B are removed by compressed air. The parts removed from the adjustment means 4A and 4B are returned to the feed tank. Accordingly, the parts feeder is free of the problem that the parts are entangled with one another at the adjustment means 4A and 4B when the parts are stopped so as to clog and the spiral conveyance path 1 with the entangled parts.

Feed of the parts along the spiral conveyance path 1 to the linear conveyance path 2 is stopped until no fill condition is detected by the light sensor 5b and no fill detection signal is fed to the controller 7 for a predetermined consecutive time t2. When no fill detection signal is fed to the controller 7 for the predetermined consecutive time t2, the controller 7 feeds a command signal to the feeder operation means 8 in order to restart parts feed along the spiral conveyance path 1. If parts were present at the adjustment means 4A and 4B when parts feed is thus restarted, the parts would be entangled with one another due to vibrations arising when the parts are moved again. However, in this embodiment, the parts at the adjustment means 4A and 4B have been removed before parts feed is restarted. Therefore, the parts remaining on the spiral conveyance path 1 and the linear conveyance path 2 are moved smoothly.

With the embodiment described above, compressed air is blown to the adjustment means 4A and 4B, which are readily clogged with parts, in order to remove the parts from the adjustment means 4A and 4B while the parts are kept stationary on the basis of the signal generated by the fill detection means 5. Therefore, it is possible to eliminate the problem that conveyance of parts is interrupted by entangled parts.

The compressed air feed means should remove at least the parts present at the adjustment means, and may remove also the parts present in the region outside of the adjustment means. Also, the number of the air nozzles of the compressed air feed means, the method by which the fill detection means detects the fill condition, and the configuration of the parts feeder are not limited to those described above.

We claim:

1. A parts feeder for feeding a plurality of parts along an annular conveyance path and a linear conveyance path connected to the annular conveyance path, the parts feeder comprising an adjustment means which is provided midway along the annular conveyance path and which adjusts the parts, and a fill detection means which is provided midway along the linear conveyance path and which detects filling of the linear conveyance path with the parts and generates a fill signal in order to stop parts feed to the linear conveyance path when the linear conveyance path is filled with the parts,
 wherein said adjustment means adjusts orientation and position of the parts and thus is prone to being clogged with any parts located within said adjustment means while the parts feed to the linear conveyance path is stopped,
 further wherein a compressed air feed means is provided in the vicinity of said adjustment means for blowing compressed air against at least the parts located at said adjustment means in order to remove said parts from said adjustment means while the parts feed to the linear conveyance path is stopped to attendantly eliminate clogging of said adjustment means with any parts located therein.

2. A parts feeder as defined in claim 1 further wherein said fill detection means is composed of a light emission means, which emits light to said linear conveyance path, and a light sensor which detects the light.

3. A parts feeder as defined in claim 1, further wherein said compressed air feed means comprises an air nozzle disposed so as to face said adjustment means and blow compressed air against said adjustment means in a direction approximately reverse to that in which said parts are conveyed.

* * * * *